US008366176B2

(12) United States Patent
Kaburaki

(10) Patent No.: US 8,366,176 B2
(45) Date of Patent: Feb. 5, 2013

(54) VEHICLE DOOR-OPEN LIMITING DEVICE

(75) Inventor: Makoto Kaburaki, Greensburg, IN (US)

(73) Assignee: Mitsui Kinzoku Act Corporation (JP)

( * ) Notice: Subject to any disclaimer, the term of this patent is extended or adjusted under 35 U.S.C. 154(b) by 78 days.

(21) Appl. No.: 12/825,695

(22) Filed: Jun. 29, 2010

(65) Prior Publication Data

US 2011/0314739 A1 Dec. 29, 2011

(51) Int. Cl.
*B60J 5/00* (2006.01)

(52) U.S. Cl. ............................ 296/146.4; 296/56; 49/28

(58) Field of Classification Search .................... 296/56, 296/76, 106, 146.4, 146.8, 146.11; 16/82, 16/354; 49/138, 139, 339, 340, 341, 342, 49/344, 26, 28; 74/575–578
See application file for complete search history.

(56) References Cited

U.S. PATENT DOCUMENTS 6,116,580 A * 9/2000 Hull .............................. 254/357
6,137,249 A * 10/2000 Butler et al. .................. 318/266
6,711,855 B1 * 3/2004 Daniels et al. .................. 49/342
7,104,589 B2 * 9/2006 Takeda et al. .............. 296/146.8
7,201,430 B2 * 4/2007 Sakai et al. ................ 296/146.8
7,429,073 B2 * 9/2008 Watanabe et al. .......... 296/146.4
7,845,706 B2 * 12/2010 Watanabe et al. .......... 296/146.8
7,866,728 B2 * 1/2011 Suzuki ........................ 296/146.4
2005/0127711 A1 * 6/2005 Rigorth et al. ............. 296/146.4
2006/0071504 A1 * 4/2006 Ishihara et al. ............ 296/146.4

FOREIGN PATENT DOCUMENTS

JP 09-109677 4/1997

* cited by examiner

*Primary Examiner* — Glenn Dayoan
*Assistant Examiner* — Jason S Daniels
(74) *Attorney, Agent, or Firm* — Ostrolenk Faber LLP

(57) ABSTRACT

In order to avoid a vehicle door hitting the ceiling or wall when the door opens, it is necessary to provide an open-limiting device for holding the door at any open angle. The door is opened with a gear in the open-limiting device. In the open-limiting device for a vehicle door, a ratchet engages with or disengage from the gear by an electric actuator, so that the door is held at any open angle. When the ratchet engages with the gear, the ratchet is capable of disengaging from the gear only if the door is closed, but the ratchet remains in engagement with the gear if the door is opened. So the door can be closed manually by a small force.

10 Claims, 6 Drawing Sheets

VEHICLE DOOR-OPEN LIMITING DEVICE

BACKGROUND OF THE INVENTION

The present invention relates to a vehicle door open-limiting device in which a door can be held at any open angle.

If a swinging door of a vehicle is carelessly opened nearly to a fully-open position close to another vehicle or a wall, not only the door but also the other is likely to be damaged by hitting the other. A liftgate of a vehicle is likely to hit the ceiling. To prevent such accident, a device for preventing the door from opening all the way is proposed.

In JP3461986B2, a locking device for preventing a door from opening comprises a rack which moves with opening of the door; a pinion which engages with the rack; a ratchet elastically fixed to the pinion; a locking member which engages with and disengages from the ratchet for locking and unlocking respectively; and a solenoid for actuating the locking member.

The locking device comprises a lot of elements such as the locking member, rack and pinion for keeping the door from opening, so that the structure is complicated and becomes larger.

SUMMARY OF THE INVENTION

In view of the disadvantages, it is an object of the invention to provide an open-limiting device of a vehicle door, its structure being simple to hold the door at any open angle.

DETAILED DESCRIPTION OF PREFERRED EMBODIMENT

One embodiment of the invention will be described with respect to FIGS. 1-8.

Figure 1:
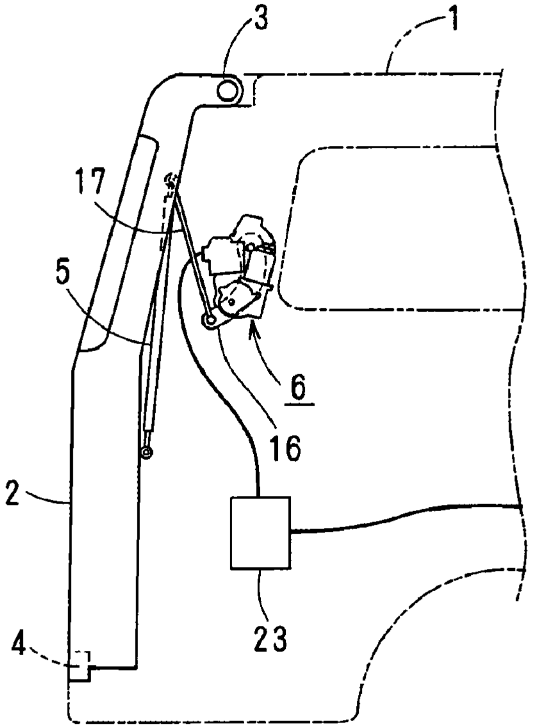
FIG. 1 is a side elevational view of the rear part of a vehicle.
Figure 2:
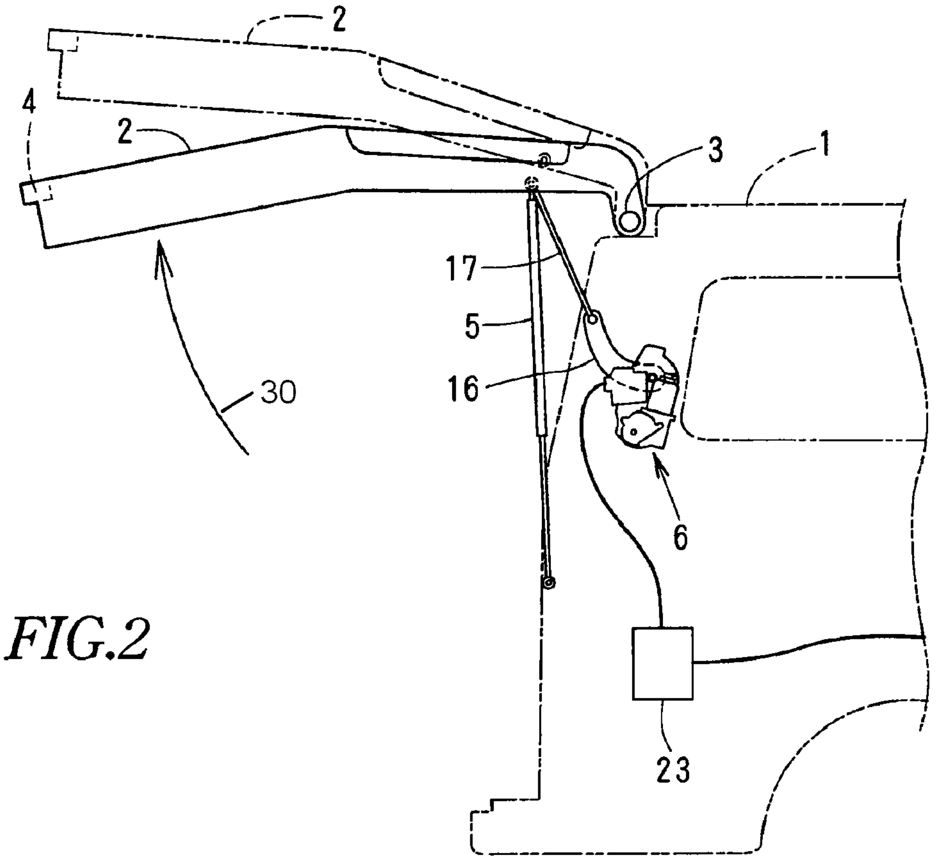
FIG. 2 is a side elevational view when a liftgate is open.

In FIGS. 1 and 2, a liftgate 2 is supported at the back of a vehicle body 1 of a minivan to open and close vertically. The liftgate 2 is pivotally mounted with a transverse hinge shaft 3 to open and close vertically at the rear end of a roof of the vehicle body 1 and is movable between a closed position in FIG. 1 for closing an opening at the rear end of the vehicle body 1 and a fully-open position as shown by dotted lines in FIG. 2 for forming the opening by swinging up the liftgate 2. In FIGS. 1, 2 and 4-8, the left is the rear of the vehicle, and the right is the front of the vehicle.

A door latch 4 at the lower end of the liftgate 2 engages with a striker (not shown) of the vehicle body, and the liftgate is held in the closed position. When the liftgate 2 is fully open, one stopper contacts the other in a door hinge, and the liftgate 2 is kept from going up further.

Between the vehicle body 1 and the liftgate 2, there is provided an air damper 5 the upper end of which is pivotally mounted to the liftgate 2, the lower end being pivotally mounted to the vehicle body 1. To reduce a force for opening the liftgate 2, a pre-force for opening the liftgate is applied to the liftgate 2. Thus, from just before the fully-open position, the liftgate 2 is elevated to the fully-open position by the air damper 5.

Figure 3:
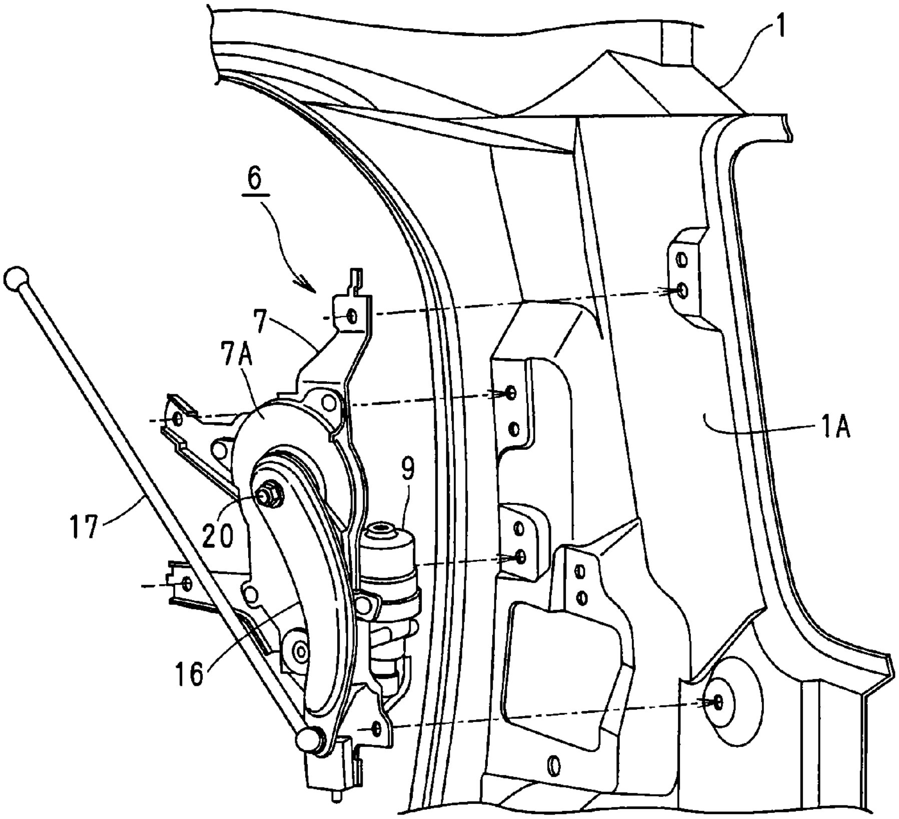
FIG. 3 is a perspective view seen from the interior of a vehicle before an opening unit of a vehicle door open-limiting device according to the present invention is installed on the vehicle body.

In FIG. 3, on a rear side panel 1A of the vehicle body 1, an opening unit 6 for opening and closing the liftgate 2 with a motor 9 is secured. In this embodiment, the unit 6 is a one-side drive type mounted to the left rear side panel 1A, but may be a both-side type in which right and left opening units are mounted on right and left rear side panels.

Figure 4:
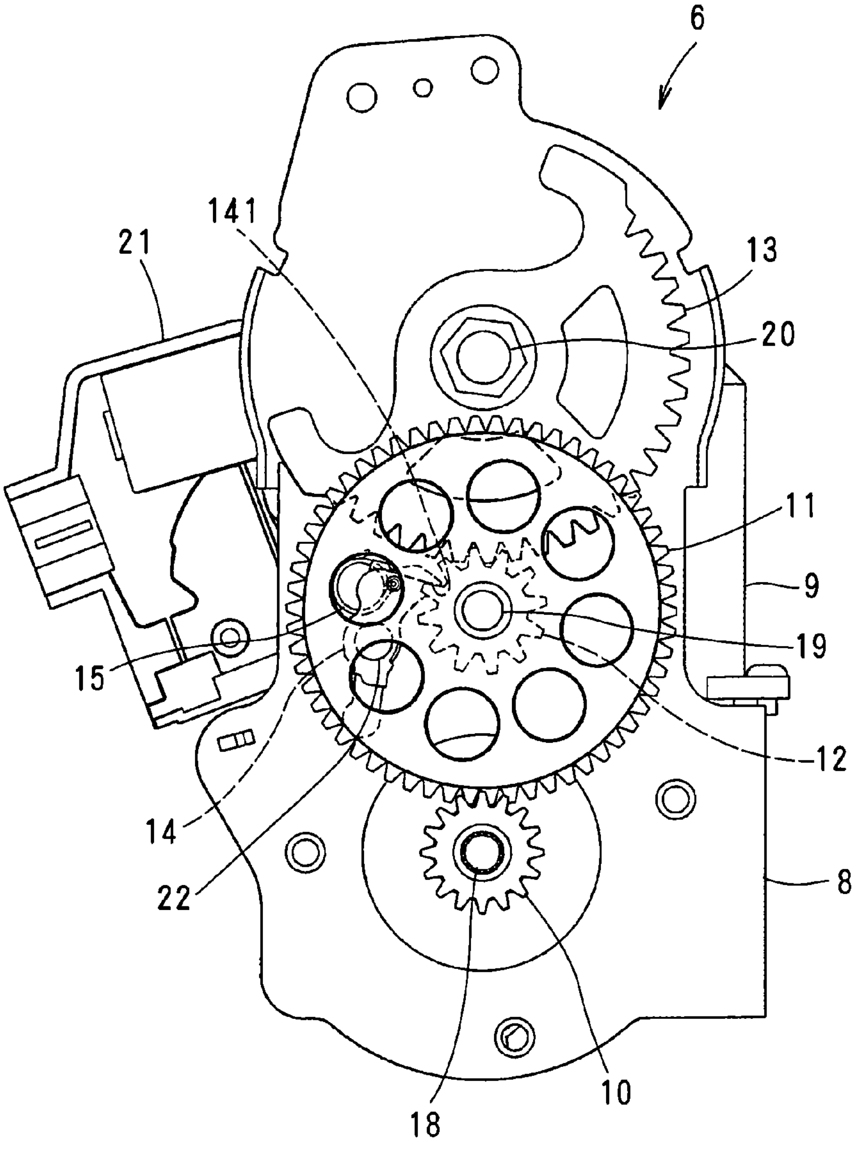
FIG. 4 is a side elevational view of the opening unit according to the present invention.
Figure 5:
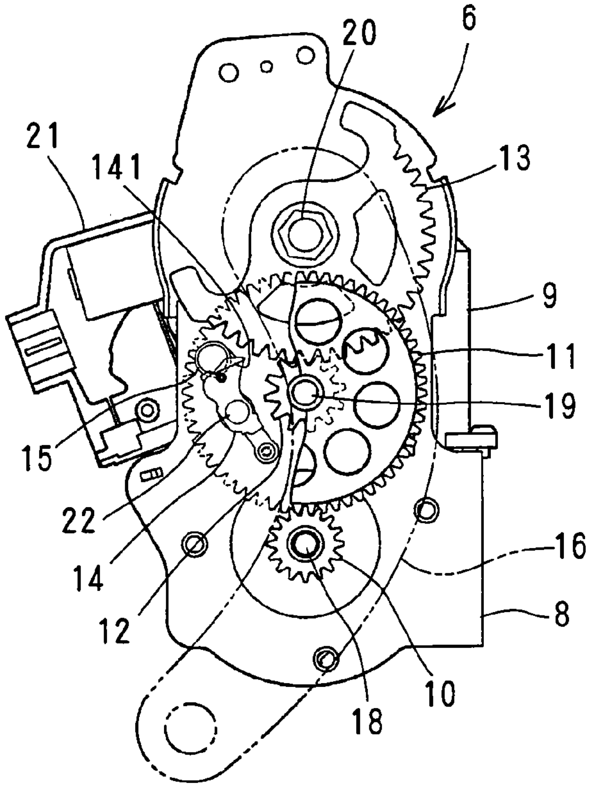
FIG. 5 is a partially cutaway side elevational view of the opening unit when a ratchet is in a disengagement position.
Figure 6:
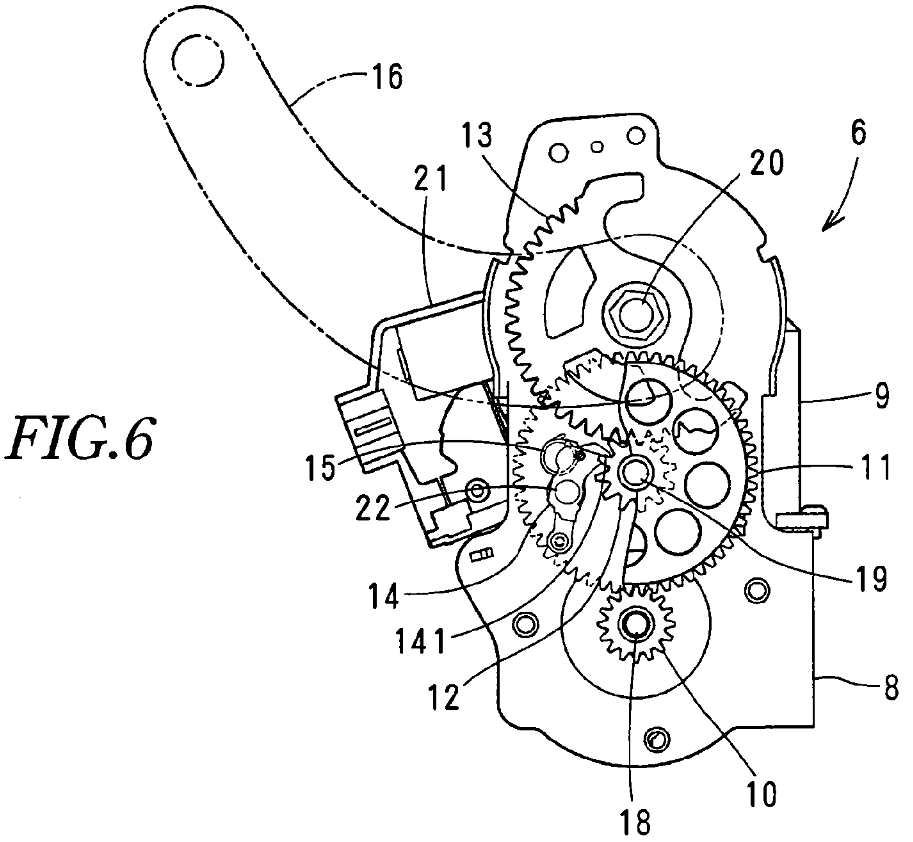
FIG. 6 is a partially cutaway side elevational view of the opening unit when the ratchet is in an engagement position.

In FIGS. 4-6, the opening unit 6 comprises a base member 8 fixed to a bracket 7 in FIG. 3 with a plurality of bolts on the rear side panel 1A; the motor 9 mounted to the base member 8; the first reduction gear 10 which is connected to an output shaft of the motor 9 via a worm gear (not shown); an electromagnetic clutch (not shown) provided in a rotation-transmitting path between the output shaft of the motor 9 and the first reduction gear 10; the second reduction gear 11 which meshes with the first reduction gear 10 to reduce rotation of the first reduction gear 10 further; a pinion 12 which rotates together with the second reduction gear 11; a sector gear 13 which meshes with the pinion 12; a ratchet 14 which can engage with the pinion 12; a spring 15 for forcing the ratchet 14 in a direction of engagement where the ratchet 14 engages with the pinion 12 and in a direction of disengagement where the ratchet 14 disengages from the pinion 12; an arm 16 connected to the liftgate 2 via a connecting rod 17 in FIGS. 1-3 to rotate together with the sector gear 13; and an actuator 21 which includes a motor for driving the ratchet 14. When the opening unit 6 is mounted to the vehicle body 1, the gears 10,11,12 and the sector gear 13 which are covered with a case 7A in FIG. 3 are not exposed to the interior of the vehicle.

The first reduction gear 10, the second reduction gear 11, the pinion 12, the sector gear 13; the arm 16 and the connecting rod 17 rotate with the motor 9 and constitute a driving-force-transmitting unit which turns with opening and closing of the liftgate 2. The driving-force transmitting unit is not limited to this embodiment, but may be changed in the number and position of gears. At least one gear with which the ratchet 14 engages may be provided.

The pinion 12, the ratchet 14, a pawl 141, the spring 15 and the actuator 21 constitute an opening-limiting unit for holding the liftgate 2 at any position before a fully-open position of the liftgate 2.

A latch-releasing motor-including actuator (not shown) connected to the motor 9, the electromagnetic clutch and the actuator 21 of the opening unit 6 and the door-latch device 4 are controlled by a control circuit 23 in the vehicle body 1 shown in FIGS. 1 and 2.

The control circuit 23 comprises a drive circuit for driving the motor 9, the electromagnetic clutch, the actuator 21 and the latch-releasing actuator; a switch by the driver's seat; a switch on the outer surface of the liftgate 2; an SW input circuit for feeding an operating signal of the switch such as a wireless remote control switch; a liftgate-position-detecting circuit for detecting a position of the liftgate 2 according to a pulse signal supplied from a rotation sensor for detecting rotation of a rotary plate (not shown) which turns with the first reduction gear; and a liftgate-moving-direction detecting circuit for detecting a moving direction of the liftgate 2.

The rotation of the motor 9 is transmitted to the arm 16 via the connected electromagnetic clutch, the first reduction gear 10, the second reduction gear 11, the pinion 12 and the sector gear 13. Furthermore, the rotation of the arm 16 is transmitted to the liftgate 2 via the connecting rod 17 thereby opening and closing the liftgate 2.

The electromagnetic clutch enables the rotation-transmitting path between the output shaft of the motor 9 and the first reduction gear 10 to be connected and disconnected. Connection of the rotation transmitting path with the switch enables the rotation of the motor 9 to be transmitted to the first reduction gear 10, while disconnection of the rotation transmitting path enables the rotation of the motor 9 not to be transmitted to the first reduction gear 10, and enables rotation of the first reduction gear 10 following opening/closing action of the liftgate 2 not to be transmitted to the output shaft of the motor 9. Thus, when the electromagnetic clutch is disconnected, the liftgate 2 can be opened or closed manually by a small force because opening/closing action of the liftgate 2 is not transmitted to the output shaft of the motor 9.

The first reduction gear 10, the second reduction gear 11 and the sector gear 13 are pivotally mounted on shafts 18, 19 ,20 respectively to the base member 8. The pinion 12 is formed together with the second reduction gear 11 and rotates together with the second reduction gear 11 about the shaft 19.

The arm 16 is fixed to the shaft 20 at the lower part to rotate together with the sector gear 13, and the top is pivotally mounted to the liftgate 2 with the connecting rod 17. When the liftgate 2 is opened, the arm 16 turns clockwise in FIG. 5 with the sector gear 13, and the arm 16 turns counterclockwise in FIG. 6 when the liftgate 2 is closed. The connecting rod 17 is pivotally mounted at the lower end to the top end of the arm 16, and at the upper end to the liftgate 2.

When the liftgate 2 is opened, the pinion 12 turns with the second reduction gear 11 counterclockwise in FIGS. 4-7. When the liftgate 2 is closed, the pinion 12 turns with the second reduction gear 11 clockwise in FIGS. 4-7.

Figure 7:
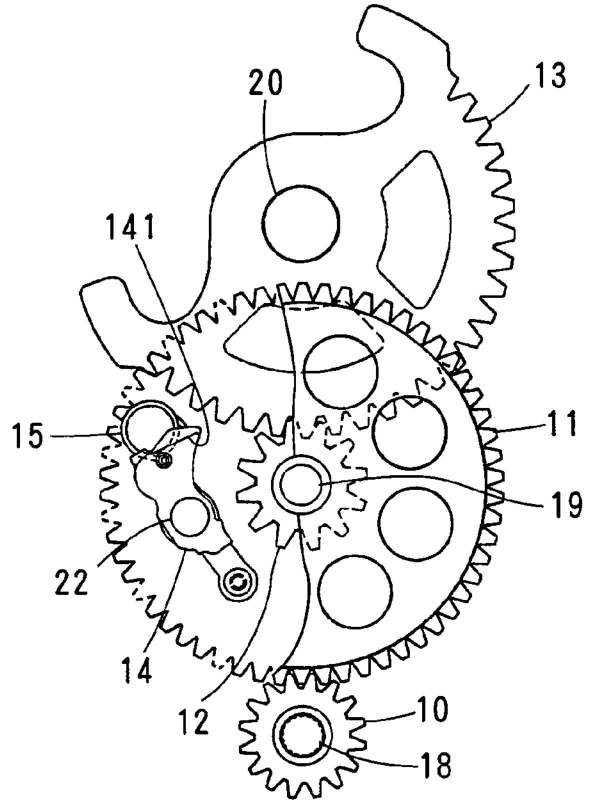
FIG. 7 is an enlarged side elevational view of the opening unit when the ratchet is in the disengagement position.
Figure 8:
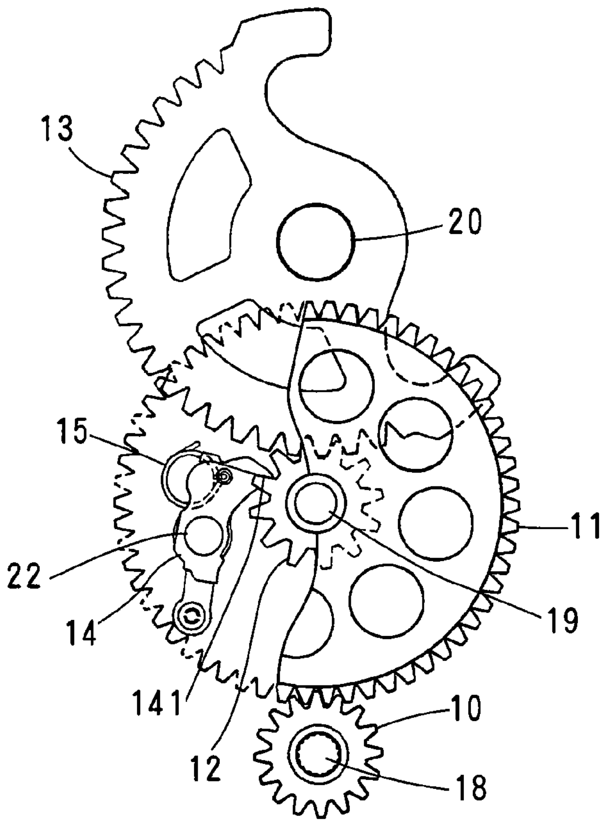
FIG. 8 is an enlarged side elevational view of the opening unit when the ratchet is in the engagement position.

The ratchet 14 is pivotally mounted on a transverse shaft 22 close to the pinion 12 on the base member 8 and can turn between an engagement position in FIGS. 4, 6 and 8 and disengagement position in FIGS. 5 and 7, the ratchet 14 turning a predetermined angle counterclockwise from the engagement position. When the ratchet 14 is in the disengagement position, it contacts a stopper (not shown) of the base member 8 so as not to turn further counterclockwise.

The pawl 141 is provided at the upper end of the ratchet 14. When the ratchet 14 is in the engagement position, the pawl 141 engages with a tooth of the pinion 12 and disengages from the tooth of the pinion 12 when the ratchet 14 is in the disengagement position. The tooth of the pinion 12 transmits rotation of the motor to the sector gear 13.

When the pawl 141 of the ratchet 14 engages with the tooth of the pinion 12, the pinion 12 is prevented from turning counterclockwise or in a direction for opening the liftgate 2. When the pinion 12 rotates clockwise or in a direction for closing the liftgate 2, the pawl 141 disengages from the tooth of the pinion 12. When the pawl 141 of the ratchet 14 engages with the pinion 12, the liftgate 2 can not be opened, but can be closed.

The spring 15 is a torsion spring which is mounted to the base member 8 at one end and to the ratchet 14 at the other end to change a forcing direction toward the ratchet 14 at the nearly middle position of motion of the ratchet 14. When the ratchet 14 is in the engagement position, a pushing direction of the spring 15 is in an engagement direction to engage the pawl 141 with the pinion 12 and the pushing direction of the spring 15 changes to a disengagement direction opposite the engagement direction when the ratchet 14 moves toward a disengagement position from the engagement position at the nearly middle position of the motion of the ratchet 14.

The actuator 21 has an output lever (not shown) coupled to the ratchet 14 and moves the ratchet 14 from the disengagement position to the engagement position according to a signal of a switch operated at an optional timing during opening of the liftgate 2. Even if electric power is not fed into the actuator 21 after the ratchet 14 moves to the engagement position, the ratchet 14 is held in the engagement position by the force of the spring 15.

The operation of the embodiment will be described.

When the Liftgate 2 is Opened by the Opening Unit 6 from a Closed Position to a Fully-open Position When the liftgate 2 is closed, the door latch device 4 engages with the striker, and the ratchet 14 is held in the disengagement position by a force of the spring 15 in FIGS. 5 and 7. The arm 16 is directed downward.

When the switch is actuated to open the liftgate 2, an opening signal is fed into the control circuit 23. The latch-releasing actuator is controlled for unlatching, so that the door latch device 4 is disengaged from the striker. Then, the motor 9 of the opening unit is driven and the electromagnetic clutch is connected. The rotation of the motor 9 is transmitted to the liftgate 2 via the electromagnetic clutch, the first reduction gear 10, the second reduction gear 11, the pinion 12, the sector gear 13, the arm 16 and the connecting rod 17, so that the liftgate 2 is opened, the opening of the liftgate 2 being indicated by arrow 30. The pawl 141 of the ratchet 14 does not engage with or contact the pinion 12, so that the gears 10,11, 12 and the sector gear 13 can turn smoothly. The ratchet 14 is held in the disengagement position by a force of the spring 15, and it is not necessary to hold the ratchet 14 in the disengagement position by driving the actuator 21 thereby reducing electric power consumption when the liftgate 2 is opened.

If the liftgate 2 does not hit a ceiling even in a fully-open position, the liftgate 2 continues to open until the stoppers of the door hinge contact each other. The position detecting circuit of the control circuit 23 detects the fully-open position when the liftgate is fully open, so that the motor 9 and the electromagnetic clutch are stopped. Thus, the liftgate 2 stops and is held in the fully-open position shown by the dotted lines in FIG. 2 by the force of the air damper.

If the liftgate 2 hits a low ceiling in the fully-open position, the switch is pressed down at any position where the liftgate 2 has to stop. A stopping signal is fed into the control circuit 23, and the motor 9 and the electromagnetic clutch are stopped, while the actuator 21 is controlled.

In FIGS. 6 and 8, the ratchet 14 moves from the disengagement position to the engagement position against the force of the spring 15 by the actuator 21, so that the pawl 141 of the ratchet 14 engages with the tooth of the pinion 12.

The pinion 12 is prevented from turning in an opening direction, so that the liftgate 2 can be held at any position before the fully-open position as shown by solid lines in FIG. 2. The air damper 5 forces the liftgate 2 held at any angle, but the pawl 141 of the ratchet 14 engages with the pinion 12, preventing the liftgate 2 from opening further.

If the liftgate 2 is held on the way of opening, any open angle of the liftgate 2 is detected by the liftgate-position detecting circuit of the control circuit 23 and is memorized therein.

When the Liftgate 2 is Closed with the Switch from a Position Where the Liftgate 2 is Held at any Open Angle When a closing signal of the switch is fed into the control circuit 23, the motor 9 of the opening unit 6 is controlled in a closing direction, and the disconnected electromagnetic clutch is connected. Thus, the rotation of the motor 9 is transmitted to the liftgate 2 via the electromagnetic clutch, the first reduction gear 10, the second reduction gear 11, the pinion 12, the sector gear 13, the arm 16 and the connecting rod 17. When the pinion 12 turns in the closing direction, the pawl 141 of the ratchet 14 in the engagement position is jumped up by rotation of the pinion 12 in a closing direction and leaves the tooth of the pinion 12. The pawl 141 is moved by the force of the spring 15 and held in the disengagement position. Instead of the foregoing control process, the actuator 21 may be controlled by the control circuit 23 to allow the ratchet 14 to disengage from the pinion 12.

The liftgate 2 is closed by rotation of the motor 9 and the door latch device 4 engages with the striker, so that the liftgate 2 is held at a closed position.

When the Liftgate 2 is Closed Manually from a Position Held at any Open Angle When the liftgate 2 held at any open angle is closed, the pinion 12 turns to close the liftgate 2. At the same time, the pawl 141 of the ratchet 14 is jumped up by the pinion 12, and the ratchet 12 leaves the pinion 12, so that the liftgate 2 can be closed smoothly.

When the Liftgate 2 Held at any Open Angle is Closed and Opened Again

The optional open angle is memorized in the control circuit 23. Even if the liftgate 2 is not stopped, the liftgate 2 reaches to the open angle memorized in the control circuit. The actuator 21 is automatically controlled to allow the ratchet 14 to engage with the pinion 12, so that the liftgate 2 can be held at the same angle as before.

Figure 9:
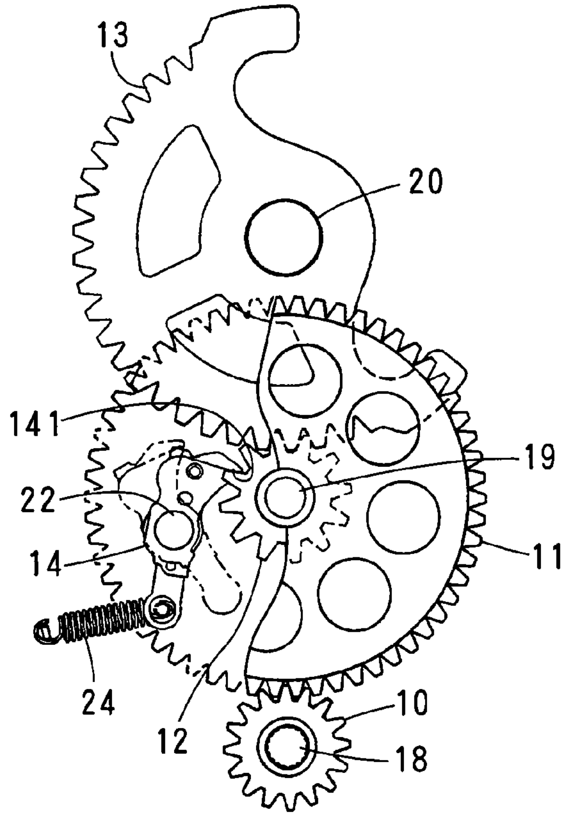
FIG. 9 is an enlarged side elevational view of another embodiment of an opening unit.

FIG. 9 is another embodiment of the invention, in which a spring 24 for forcing a ratchet 14 is different from the spring 15 in the former embodiment. Except for the spring 24 and the control circuit 23, all is the same as in the foregoing embodiment. The control circuit 23 is a little different from the one in the former embodiment.

The spring 24 comprises a coil spring where one end is coupled to the lower end of the ratchet 14 and the other end is coupled to a base member 8, applying a constant force to the ratchet 14 in an engagement direction or clockwise in FIG. 9. If an actuator 21 is not driven, the ratchet 14 will remain in engagement with the pinion 12.

To open the liftgate 2 with a switch from a closed position, an opening signal is fed into a control circuit 23. As well as in the former embodiment, after or at the same time that a latch-releasing actuator is actuated for unlatching, the actuator 21 is controlled to move the ratchet 14 against the force of the spring 24 from an engagement position in a solid line to a disengagement position in a dotted line in FIG. 9. The motor 9 and the electromagnetic clutch are controlled, so that the liftgate 2 is opened.

During opening of the liftgate 2, with the switch, the motor 9, the electromagnetic clutch and the actuator 21 are controlled to hold the liftgate 2, and by the force of the spring 24, the ratchet 14 engages with the pinion 12 to prevent the liftgate from opening. In this embodiment, the holding position during opening is memorized in the control circuit 23.

When the liftgate 2 is held at any open angle before the fully-closed position, the liftgate 2 starts to close with the switch as well as in the former embodiment. The ratchet 14 is forced by the spring 24 in the engagement direction. With rotation of the pinion 12 in the closing direction, the ratchet 14 jumps over one tooth of the pinion 12 at a time as the pinion 12 turns in the closing direction. If this action is not preferred, the actuator 21 is controlled with the closing action of the switch to enable the liftgate 2 to close while the ratchet 14 is held so as to disengage from the pinion 12.

The embodiments of the invention are described as above, and various modifications and changes may be made without departing from the scope of claims.

1) The open angle of the liftgate 2 memorized in the control circuit 23 may be rewritten to a new open angle during a later opening.

2) The opening-limiting unit in this embodiment may be applied to the liftgate which can be opened and closed manually without the opening unit 6. While the liftgate 2 is moved to any open angle, the actuator 21 is controlled with the switch to allow the ratchet 14 to engage with the pinion 12.

3) The open-limiting unit in this invention may be applied to a side door which opens and closes horizontally.

4) Instead of the pinion 12, the ratchet 14 may engage with the first reduction gear 10, the second reduction gear 11 or the sector gear 13.

5) Without the spring 15,24 in the open-limiting unit, the ratchet 14 may be engaged or disengaged by the actuator.

What is claimed is:

1. A vehicle door open-limiting device comprising:

a door supported on a vehicle body to open and close between a closed position and a fully-open position;

a motor;

a driving-force transmitting unit that rotates with the motor to open and close the door, the driving-force transmitting unit comprising a first reduction gear driven by the motor, a second reduction gear that meshes with the first reduction gear, a pinion that rotates with the second reduction gear, and a third gear that meshes with the pinion;

a ratchet that engages with and disengages from the pinion, the ratchet keeping the pinion from turning in a direction for opening the door when the ratchet engages with the pinion, the ratchet also being capable of disengaging from the pinion to permit the pinion to turn in a direction for closing the door;

a spring that forces the ratchet to engage with the pinion; and an electric actuator that allows the ratchet to engage with or disengage from the pinion against a force of the spring.

2. The vehicle door open-limiting device of claim 1 wherein the spring comprises a coil spring.

3. The vehicle door open-limiting device of claim 1 wherein the spring forces the ratchet not only to engage with the pinion but also to disengage from the pinion, the ratchet disengaging from the pinion to allow the spring to force the ratchet from engagement with the pinion to disengagement from the pinion, the actuator allowing the ratchet to engage with the pinion.

4. The vehicle door open-limiting device of claim 1 wherein the spring comprises a torsion spring.

5. The vehicle door open-limiting device of claim 1, further comprising a base member to which the pinion is pivotally mounted on a shaft, the ratchet being pivotally mounted on a shaft to the base member.

6. The vehicle door open-limiting device of claim 1 wherein the driving-force transmitting unit further comprises an arm that rotates together with the third gear; and a connecting rod pivotally mounted at a lower end to the arm and at an upper end to the door so that the door is opened by the motor.

7. The vehicle door open-limiting device of claim 1 wherein the door comprises a liftgate that opens and closes vertically at a rear end of the vehicle body.

8. The vehicle door open-limiting device of claim 1 wherein the third gear comprises a sector gear.

9. The vehicle door open-limiting device of claim 1 wherein the ratchet is arranged between the vehicle body and the second reduction gear.

10. The vehicle door open-limiting device of claim 1 wherein the electric actuator is controlled by a switch.

* * * * *